(12) United States Patent
Andre

(10) Patent No.: US 8,113,547 B2
(45) Date of Patent: Feb. 14, 2012

(54) SNAP MOUNT FLUID QUICK CONNECTOR

(75) Inventor: Michael J. Andre, Waterford, MI (US)

(73) Assignee: Cooper Standard Automotive Inc., Novi, MI (US)

( * ) Notice: Subject to any disclaimer, the term of this patent is extended or adjusted under 35 U.S.C. 154(b) by 672 days.

(21) Appl. No.: 10/979,481

(22) Filed: Nov. 2, 2004

(65) Prior Publication Data

US 2005/0134040 A1    Jun. 23, 2005

Related U.S. Application Data

(63) Continuation of application No. 10/796,677, filed on Mar. 9, 2004, now Pat. No. 7,029,036, and a continuation-in-part of application No. 10/796,677, filed on Mar. 9, 2004, now Pat. No. 7,029,036, and a continuation-in-part of application No. 10/104,405, filed on Mar. 22, 2002, now Pat. No. 6,905,143.

(51) Int. Cl.
F16L 39/00 (2006.01)

(52) U.S. Cl. .......................... 285/319; 285/310

(58) Field of Classification Search .................. 285/305, 285/319, 921, 3, 310, 321
See application file for complete search history.

(56) References Cited

U.S. PATENT DOCUMENTS

| | | |
|---|---|---|
| 730,378 A | 6/1903 | Lambert |
| 1,232,272 A | 7/1917 | Frazier et al. |
| 1,837,345 A | 12/1931 | Thomas |
| 1,976,589 A | 10/1934 | Trickey |
| 3,120,968 A | 2/1964 | Calvin |
| 3,154,327 A | 10/1964 | Rothschild |
| 3,780,773 A | 12/1973 | Haugen |
| 3,948,548 A * | 4/1976 | Voss ............................... 285/321 |
| 4,093,279 A | 6/1978 | Verdesca et al. |
| 4,136,885 A | 1/1979 | Uhrner |
| 4,158,407 A | 6/1979 | Rest |
| 4,193,616 A | 3/1980 | Sarson et al. |
| 4,226,445 A * | 10/1980 | Kramer ........................... 285/39 |
| 4,244,608 A | 1/1981 | Stuemky |
| 4,368,904 A | 1/1983 | Lanz |
| 4,376,525 A | 3/1983 | Fremy |
| 4,423,891 A | 1/1984 | Menges |
| 4,423,892 A | 1/1984 | Bartholomew |
| 4,436,125 A | 3/1984 | Blenkush |

(Continued)

FOREIGN PATENT DOCUMENTS

DE    8215962    10/1982

(Continued)

*Primary Examiner* — Aaron Dunwoody
(74) *Attorney, Agent, or Firm* — Carlson, Gaskey & Olds, P.C.

(57) ABSTRACT

A fluid quick connector includes a retainer mounted in a housing which lockingly couples a first endform to the housing. Latch arms bendably extend from the housing for latching engagement with a second endform. An inner diameter of the latch arms are proximate the outer diameter of the first endform inserted through the housing to prevent substantial movement of the latch arms in a direction which would disengage the latch arms from the second endform. In another aspect, the retainer has inner arms which engage a recessed surface engagement feature in the first endform to lock the other endform to the housing. A portion of a spherical surface is formed on the ends of the inner arms to reduce the push in force required to insert the first endform through the housing and past the retainer.

25 Claims, 8 Drawing Sheets

U.S. PATENT DOCUMENTS

| | | | |
|---|---|---|---|
| 4,483,371 A | 11/1984 | Susin | |
| 4,483,543 A | 11/1984 | Fisher, Jr. et al. | |
| 4,561,682 A | 12/1985 | Tisserat | |
| 4,601,497 A | 7/1986 | Bartholomew | |
| 4,613,112 A | 9/1986 | Phlipot et al. | |
| 4,630,848 A | 12/1986 | Twist et al. | |
| 4,632,434 A | 12/1986 | Proctor et al. | |
| 4,647,012 A | 3/1987 | Gartner | |
| 4,681,351 A | 7/1987 | Bartholomew | |
| 4,723,796 A | 2/1988 | Nattel | |
| 4,753,458 A | 6/1988 | Case et al. | |
| 4,800,925 A | 1/1989 | Yeoman | |
| 4,834,719 A | 5/1989 | Arenas | |
| 4,846,506 A | 7/1989 | Bocson et al. | |
| 4,869,534 A | 9/1989 | Ketcham et al. | |
| 4,915,136 A | 4/1990 | Bartholomew | |
| 5,033,513 A | 7/1991 | Bartholomew | |
| 5,168,902 A | 12/1992 | Hood | |
| 5,195,787 A | 3/1993 | Bartholomew | |
| 5,201,552 A | 4/1993 | Hohmann et al. | |
| 5,219,188 A | 6/1993 | Abe et al. | |
| 5,226,682 A | 7/1993 | Marrison et al. | |
| 5,273,254 A | 12/1993 | MnNaughton et al. | |
| 5,285,807 A | 2/1994 | Nitzberg | |
| 5,310,226 A | 5/1994 | Norkey | |
| 5,342,095 A | 8/1994 | Klinger et al. | |
| 5,354,103 A | 10/1994 | Torrence et al. | |
| 5,364,131 A | 11/1994 | Hartsock et al. | |
| 5,395,140 A * | 3/1995 | Wiethorn | 285/93 |
| 5,401,063 A | 3/1995 | Plosz | |
| 5,405,175 A | 4/1995 | Bonnah et al. | |
| 5,472,016 A | 12/1995 | Szabo | |
| 5,492,371 A | 2/1996 | Szabo | |
| 5,542,716 A | 8/1996 | Szabo et al. | |
| 5,544,858 A | 8/1996 | Rogers et al. | |
| 5,607,190 A * | 3/1997 | Exandier et al. | 285/93 |
| 5,609,370 A | 3/1997 | Szabo et al. | |
| 5,649,724 A | 7/1997 | Wiethorn | |
| 5,683,117 A | 11/1997 | Corbett et al. | |
| 5,707,084 A | 1/1998 | Szabo | |
| 5,711,508 A | 1/1998 | Schreiber et al. | |
| 5,727,821 A | 3/1998 | Miller | |
| 5,730,481 A | 3/1998 | Szabo et al. | |
| 5,758,909 A | 6/1998 | Dole et al. | |
| 5,765,877 A | 6/1998 | Sakane et al. | |
| 5,782,502 A | 7/1998 | Lewis | |
| 5,823,508 A | 10/1998 | Nie | |
| 5,860,677 A | 1/1999 | Martins et al. | |
| 5,863,077 A | 1/1999 | Szabo et al. | |
| 5,882,048 A | 3/1999 | Kawasaki et al. | |
| 5,924,746 A | 7/1999 | Fixemer | |
| 5,931,510 A | 8/1999 | Mathew et al. | |
| 5,951,059 A | 9/1999 | Kitamura | |
| 5,951,063 A | 9/1999 | Szabo | |
| 6,053,537 A | 4/2000 | Guest | |
| 6,089,620 A | 7/2000 | Mota Lopez et al. | |
| 6,142,537 A | 11/2000 | Shimada et al. | |
| 6,155,612 A * | 12/2000 | Szabo | 285/319 |
| 6,173,998 B1 | 1/2001 | Bock | |
| 6,173,999 B1 | 1/2001 | Guest | |
| 6,176,263 B1 | 1/2001 | Lacroix et al. | |
| 6,183,022 B1 | 2/2001 | Guest | |
| 6,186,561 B1 | 2/2001 | Kaishio et al. | |
| 6,220,570 B1 | 4/2001 | Heinrichs et al. | |
| 6,234,544 B1 | 5/2001 | Bartholomew | |
| 6,290,263 B1 | 9/2001 | Murken | |
| 6,293,596 B1 | 9/2001 | Kinder | |
| 6,318,764 B1 * | 11/2001 | Trede et al. | 285/305 |
| 6,328,344 B1 | 12/2001 | Tozaki et al. | |
| 6,371,529 B1 | 4/2002 | Szabo et al. | |
| 6,431,612 B1 | 8/2002 | Walker et al. | |
| 6,464,263 B1 | 10/2002 | Schwarz et al. | |
| 6,474,696 B1 | 11/2002 | Canale | |
| 6,520,546 B2 | 2/2003 | Szabo | |
| 6,612,622 B2 * | 9/2003 | Andre et al. | 285/305 |
| 6,637,779 B2 | 10/2003 | Andre | |
| 2001/0048225 A1 | 12/2001 | Andre et al. | |
| 2003/0137148 A1 | 7/2003 | Andre | |
| 2003/0178844 A1 | 9/2003 | Klinger et al. | |
| 2004/0108717 A1* | 6/2004 | Matsubara et al. | 285/330 |

FOREIGN PATENT DOCUMENTS

| | | |
|---|---|---|
| DE | 3311555 | 4/1984 |
| DE | 34 40 753 | 5/1986 |
| DE | 19722842 | 12/1998 |
| EP | 1 369 634 | 12/2003 |
| FR | 2206471 | 6/1974 |
| FR | 2266091 | 10/1975 |
| GB | 2 077 377 | 12/1981 |
| WO | WO 89/09361 | 10/1989 |
| WO | WO 98/48209 | 10/1998 |

* cited by examiner

SNAP MOUNT FLUID QUICK CONNECTOR

CROSS REFERENCE TO CO-PENDING APPLICATIONS

This application is a continuation of U.S. application Ser. No. 10/796,677, filed Mar. 9, 2004 now U.S. Pat. No. 7,029,036 and is a continuation-in-part of U.S. application Ser. No. 10/796,677, filed Mar. 9, 2004 and U.S. application Ser. Nos. 10/104,405, filed Mar. 22, 2002 now U.S. Pat. No. 6,905,143, the contents of each of which is incorporated herein in their entirety.

BACKGROUND

The present invention relates, in general, to fluid quick connectors which couple fluid carrying components.

Snap-fit or quick connectors are employed in a wide range of applications, particularly, for joining fluid carrying conduits in automotive and industrial application. In a typical quick connector with an axially displaceable retainer, the retainer is fixedly mounted within a bore in a housing of a connector component or element. The retainer has a plurality of radially and angularly extending legs which extend inwardly toward the axial center line of the bore in the housing. A tube or fitting to be sealingly mounted in the bore in the housing includes a radially upset portion or flange which abuts an inner peripheral surface of the retainer legs. Seal and spacer members as well as a bearing or top hat are typically mounted in the bore ahead of the retainer to form a seal between the housing and the fitting when the fitting is lockingly engaged with the retainer legs.

Radially displaceable retainers in which the retainer is radially displaceable through aligned bores or apertures formed transversely to the main through bore in the housing are also known. The radially displaceable retainer is typically provided with a pair of depending legs which are sized and positioned to slip behind the radially upset portion or flange on the fitting only when the fitting or conduit is fully seated in the bore in the connector. This ensures a positive locking engagement of the conduit with the connector as well as providing an indication that the conduit is fully seated since the radially displaceable retainer can be fully inserted into the connector only when the conduit has been fully inserted into the bore in the connector.

In most fluid quick connectors, one or more seal elements, such as resilient O-rings and and/or a rigid spacer member between two spaced O-rings, are mounted in the housing bore to form a seal between the housing and the inserted endform.

A top hat is typically mounted in the end of the bore to retain the seal elements in the bore prior to insertion of the endform into the bore in the housing or after removal of the endform from the housing. The top hat typically includes a sleeve portion which slides within the bore of the housing, and an end flange which seats in an enlarged end portion of the bore. While effective in securing the seal elements in the housing bore, the top hat represents an additional component which requires assembly time in the fluid quick connector.

In addition to retainers for fluid quick connectors which engage an upset in the form of an enlarged diameter bead or flange spaced from the tip end of an endform, it is also known to construct retainers for fluid quick connectors which secure the endform in the quick connector housing.

Regardless of the type of retainer, the housing of a fluid connector typically includes an elongated stem having one or more annular barbs spaced from a first end. The barbs provide secure engagement with a hose or conduit which is forced over the barbs to connect the housing with one end of the conduit.

Due to the secure engagement between the conduit and the housing, the open end of the axial through bore in the connector portion of a fluid connector designed with an axially displaceable retainer or the transverse bores in a connector designed to receive a radially displaceable retainer are fixed in one circumferential position depending upon the position of the tubing and the connector when the conduit and the connector are joined together. In certain applications, this could limit accessibility to and make it difficult to insert the retainer into the connector, particularly in the case of a radial retainer. Interference with surrounding components frequently makes access to the quick connector for both locking or unlocking operations difficult, if not impossible.

To address these problems, two part fluid quick connectors which are easily rotatable over 360° to facilitate insertion or removal of the retainer into or out of the quick connector have been devised. In such quick connectors, the quick connector housing, typically of one piece construction, is replaced with two engagable portions, one attachable to or mountable on a fluid component, such as a tube or conduit, and the other receiving a second conduit or endform as well as receiving the retainer for locking the first component and the endform together.

It would be desirable to provide an improved fluid quick connector which has enhanced snap on capability, and a minimal number of separate components. It would also be desirable to provide an improved fluid quick connector having a retainer configured for engagement with endforms having a reduced diameter engagement surface or groove.

SUMMARY

The present invention is an improved fluid quick connector for joining first and second endforms in fluid flow communication.

In one aspect the fluid quick connector includes a housing having a bore extending from an open end for receiving a first endform. A retainer in mountable in the housing for lockingly coupling the first endform in the housing.

The housing includes one or more latch arms extending axially from one end of the housing. The latch arms are configured for snap-in engagement with an enlarged groove in the second endform.

One or more seal elements are mounting in the bore of the housing or in the bore in the second endform for sealingly coupling the first endform to the housing or second housing. The bore in the housing has a stepped bore configuration formed of a first large diameter bore extending from the open end to at least one smaller diameter bore portions extending from the first bore portion. The inner diameter of the one smaller bore portion is sized to be concentrically disposed about the tip end of the second endform when the first endform is inserted into the housing. This places the latch arms in close proximity to the first endform which prevents radially inward movement of the latch arms in a direction which would disengage the housing from the second endform.

At the same time, the outer axial ends of the latch arms are positioned in the bore of the second endform to retain any seal elements mounted in the bore of the second endform. This eliminates the need for a separate top hat thereby reducing the cost and assembly time for the fluid quick connector.

In another aspect, the first endform has an engagement surface in the form of a reduced diameter annular groove spaced from the tip end of the first endform. The inner diameter of inner arms of a tranversably removable retainer are sized to engage the groove in the endform to locking couple the first endform in the housing. At the same time, the inner diameter of the retainer arms is smaller than the outer diameter of the tip end of the first endform so as to prevent insertion of the first endform into the bore in the housing if the retainer is in the fully latched position in the housing.

The retainer, which can be latched in a shipping position in the housing which allows insertion of the tip end of the first endform into the bore in the housing, can be transversely moved to the fully latched position in the housing only when the engagement surface or groove in the first endform is aligned with the inner arms of the retainer. This insures that the tip end of the first endform is fully inserted into engagement with the seal elements in the housing or the second endform when the first endform is lockingly coupled to the housing by the retainer.

In another aspect, the inner arms of the retainer have an extended length so as to be disposed between adjacent surfaces of the housing forming a portion of the transverse bore in the housing when the retainer is in the fully latched position of the quick connector. This places the ends of the inner arms in an engagement position with the housing to increase the pull out force resistance acting against separation of the first endform from housing.

In another aspect, the ends of the inner arms of the retainer are formed with a spherical surface. This reduces the push in force required to insert the tip end of the first endform past the retainer when the retainer is in the temporary shipping position in the housing.

Thus, there has been disclosed a unique fluid quick connector having numerous improvements over previously devised fluid quick connectors.

BRIEF DESCRIPTION OF THE DRAWING

The various features, advantages and other uses of the present invention will become more apparent by referring to the following detailed description and drawing in which.

DETAILED DESCRIPTION

Figure 1:
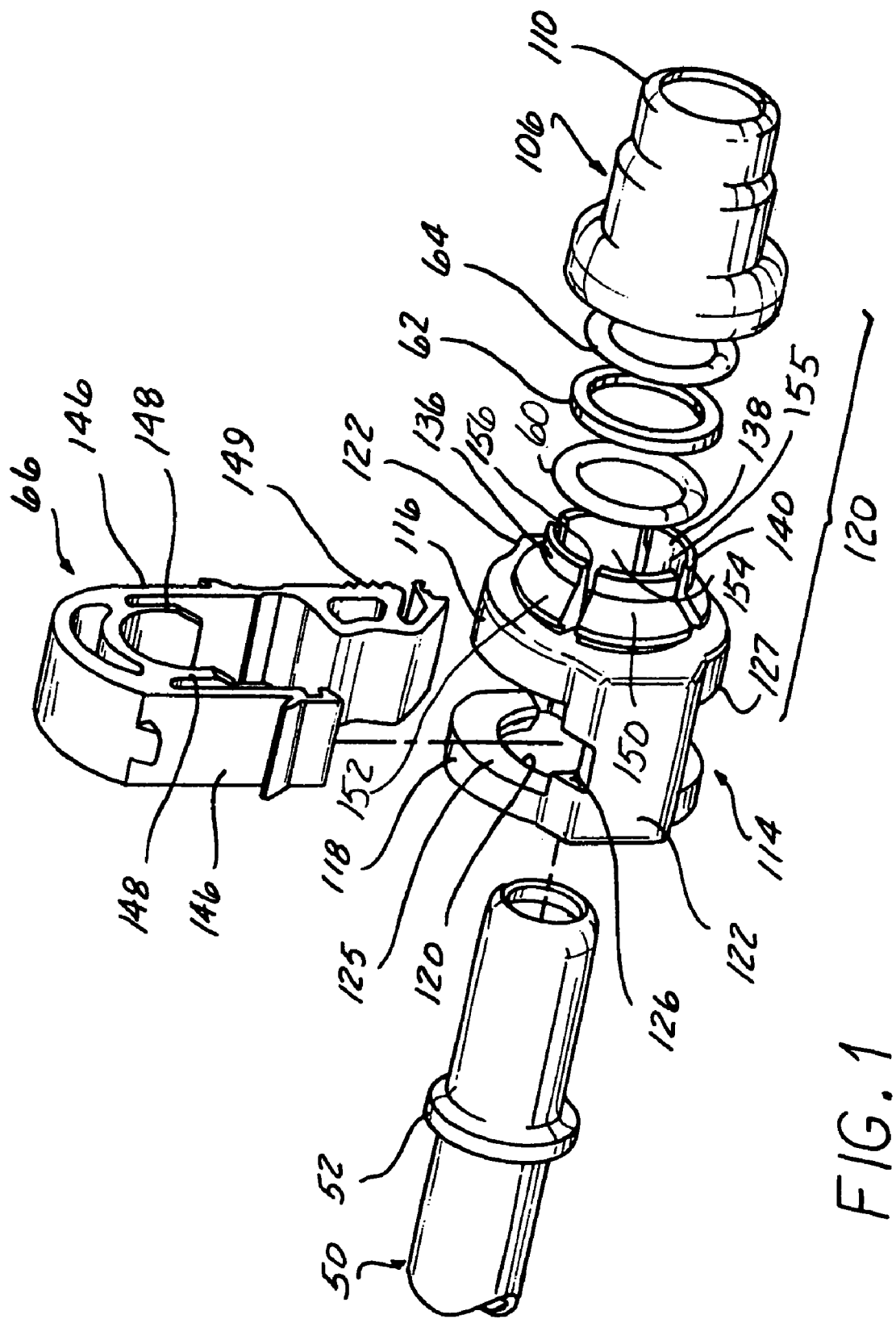
FIG. 1 is an exploded perspective view of one aspect of a fluid quick connector.
Figure 2:
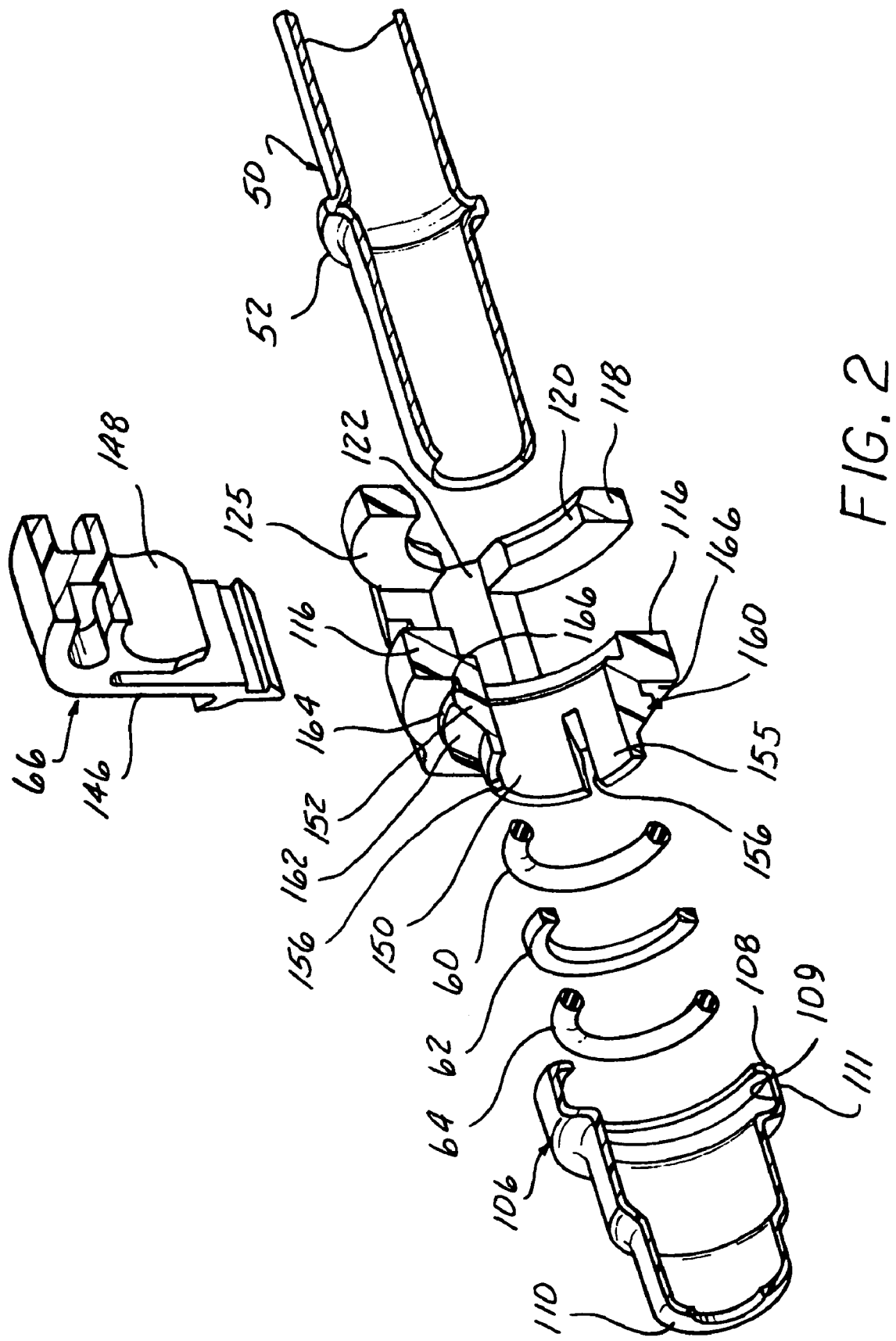
FIG. 2 is an exploded, perspective, longitudinal cross-sectional view of quick connector shown in FIG. 1.
Figure 3:
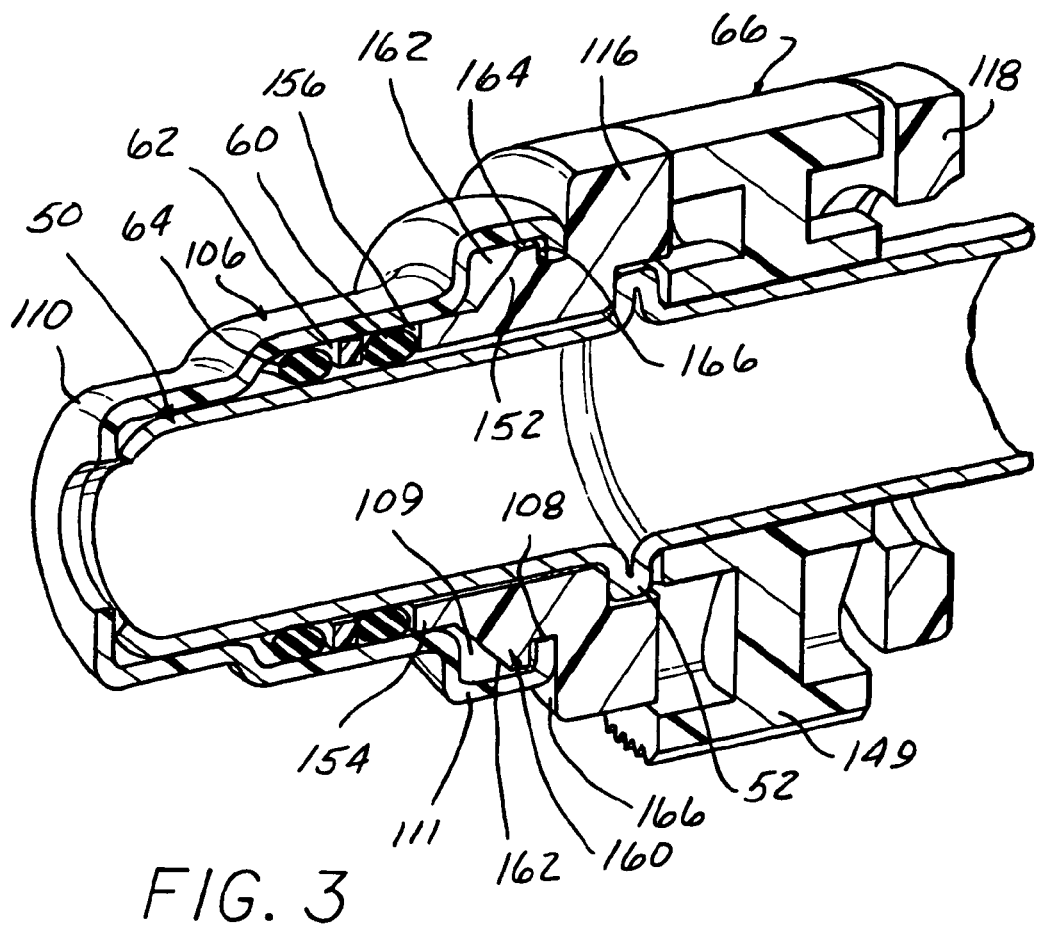
FIG. 3 is a perspective, longitudinal cross-sectional view of the assembled quick connector of FIGS. 1 and 2 shown in an assembled state.

Referring now to FIGS. 1-4 of the drawing, there is depicted a fluid quick connector 100 and, more particularly, a fluid quick connector 100 having two rotatable components, one receiving a retainer and a second mountable to or carried on a separate fluid component, such as a tubular conduit described by example only hereafter.

The fluid quick connector 100 is adapted for sealingly and lockingly, yet removably interconnecting first and second fluid members, such as conduits, in a fluid tight, leak proof, sealed connection by a snap together arrangement.

The quick connector includes a housing assembly 102 formed of the first housing 106 and a second housing 114 which are adapted to be axially connected to provide an axially extending through bore between opposite ends.

Figure 4:
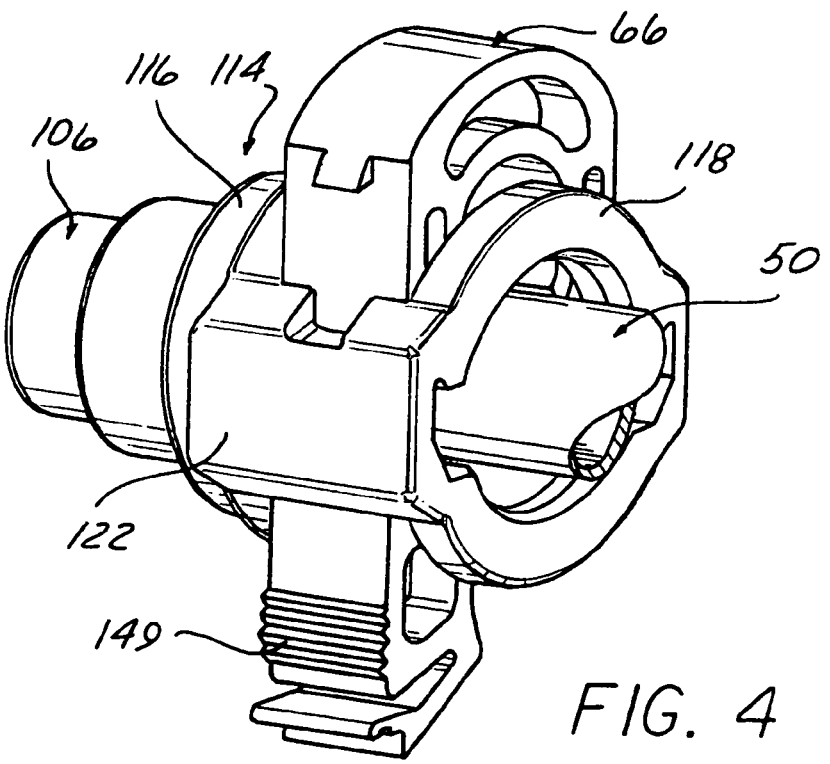
FIG. 4 is a perspective view of the quick connector in the assembled state.

The first housing 106 can be formed as an integral extension of a fluid operative device, such as a manifold, valve, etc., or as shown in FIGS. 1 and 4, of a one piece body, preferably of a high strength plastic or metal, having a stepped exterior surface housing extending from a lip 108 at one end to an opposed second end 110. At least one and, preferably, a plurality of longitudinally spaced barbs or projections not shown, may be formed along the exterior of the first housing 106 adjacent the second end 110 for secure engagement with a flexible conduit, such as a plastic or elastomer conduit, which is slidably urged thereover into sealed connection with the barbs. An annular groove or recess 109 is formed in an enlarged portion 111 in the first housing 106 adjacent the lip 108, the purpose of which will be described hereafter.

The second housing 114 is also preferably formed of a one piece, integral, unitary body, also of a high strength plastic 106. The second housing 114 includes first and second annular ring members 116 and 118, respectively. The first and second ring members 116 and 118 are spaced apart and interconnected by a pair of side flanges 122 which extend between peripheral edges of the first and second ring members 116 and 118. Notches 126 are formed along one side edge of each of the side flanges 122 for receiving an interconnecting projection in the retainer 66, as described hereafter.

Preferably, the side flanges 122 and 124 are parallel to each other and, in conjunction with the first and second ring members 116 and 118, define transversely opening apertures 125 and 127. The transversely extending apertures 125 and 127 communicate with a through bore which extends longitudinally through the second housing 114 from a first aperture 120 within the second ring member 118 to an aperture or bore 138 extending through a tubular extension or collar 136 projecting from the first ring member 116 and terminating in a first outer end 140. The collar 136 serves as a top hat to retain the seal elements 60, 62 and 64 in the bore in the first housing 106.

The quick connector 100 further includes the generally U-shaped retainer 66 adapted to be received in the transverse apertures 125 and 127 in the second housing 114 such that spaced legs 146 of the retainer 66 will pass along either side of an exposed section of a tube or conduit 50 as the retainer 66 is inserted leg-first into the second housing 114.

Each leg 146 includes an inner arm 148 which defines a "locking" surface adapted to axially oppose and preferably, axially engage one side of the upset bead or flange 52 of the tube 50 when the retainer 66 is fully inserted in the second housing 114. In this manner, the locking surface on each retainer leg serves to prevent axial displacement of the upset bead 52 from the axial bore of the housing 102 beyond a predetermined point, thereby locking the conduit therein.

The retainer 66 also includes a secondary latch 149 as described in U.S. Pat. No. 5,782,502, the contents of which are incorporated herein in its entirety with respect to the description of the structure and operation of the retainer 66.

It will also be understood that the first and second housings 106 and 114 of the connector 102 of the present invention may be used with other types of radially displaceable retainers shown in U.S. Pat. Nos. 5,542,716, 5,951,063 and 5,782,502.

Further, the swivel connection between two portions of the connector 100 can also be applied to quick connectors having axially displaceable retainers as shown in U.S. Pat. Nos. 5,542,712 and 5,456,600.

As is conventional, the side flanges 122 in the second housing 114 include a pair of centralized, axially-extending, inward opening notches, not shown, while the retainer 66 includes a catch means, such as a ramped external projection or retention barb extending outwardly on each leg. The longitudinal notches cooperate with the retention barbs to releasably secure the retainer 66 in a partially-inserted, "pre-assembly" or "shipping" position within the second housing 114.

In this manner, the retainer 66 can be retained with the second housing 114 while otherwise permitting axial passage of the upset bead into the bore past the very same locking surfaces on the retainer legs that will later prevent axial displacement of the upset bead upon full insertion of retainer 66 into the second housing 114.

A collar 136 includes a plurality of flexible or bendable legs, with four legs 150, 152, 154, and 155 being shown in FIGS. 1-4 by example. The legs 150, 152, 154 and 155 each have a generally arcuate shape and form a discontinuous circular shape for the collar 136. Two adjacent legs, such as legs 150 and 152 or legs 150 and 154, are separated by slots 156 which allow bending of each leg 150, 152, 154 and 155 during connection of the first and second housings 106 and 114.

The first and second housings 106 and 114 are swivelably and rotatably connected to each other by at least one and preferably a plurality of locking projections or fingers 160 which extend radially outward from the collar portion of the legs 150, 152, 154 and 155. Each projection 160 has a tapered or angled ramp surface 162 extending from the end portion of each leg 150, 152, 154 and 155. The ramp portion 162 terminates in a radially outer edge 164 which is disposed adjacent to an annular recess 166 formed between each projection 160 and the adjacent annular ring 116 of the second housing 114.

During engagement of the first and second housings 106 and 114, the axially extending end portion of each leg 150, 152, 154 and 155 passes freely through the open end of the bore in the first housing 106 inward of the lip 108.

The ramp surfaces 160 then engage the lip 108 and cause radially inward bending of each leg 150, 152, 154 and 156 until the top edge 164 of each leg 150, 152, 154 and 156 clears the radially inner edge of the lip 108 and brings the lip 108 into engagement with the adjacent recess 166. Each of the legs 150, 152, 154 and 156 then snaps radially outward.

In the interconnected position, the projections 160 lock the first and second housings 106 and 114 together against axial movement while still being rotatable within the enlarged end portion 111 of the first housing 106.

The lip 108 also assists in non-axially joining the first and second housings 106 and 114 while providing a rotatable surface for rotational movement of the first and second housings 106 and 114 relative to each other.

Referring now to FIGS. 5-11, there is depicted another aspect of a fluid quick connector 180 which forms a fluid coupling between a first fluid carrying component or endform 182 and a second fluid carrying component or endform 184.

It will be understood that the first and second endforms 182 and 184 may be the integral end portions of fluid carrying conduits, valves, manifolds, pump housings, etc., or discrete members mounted on such components, or separate fluid carrying components in their own right.

Figure 7:
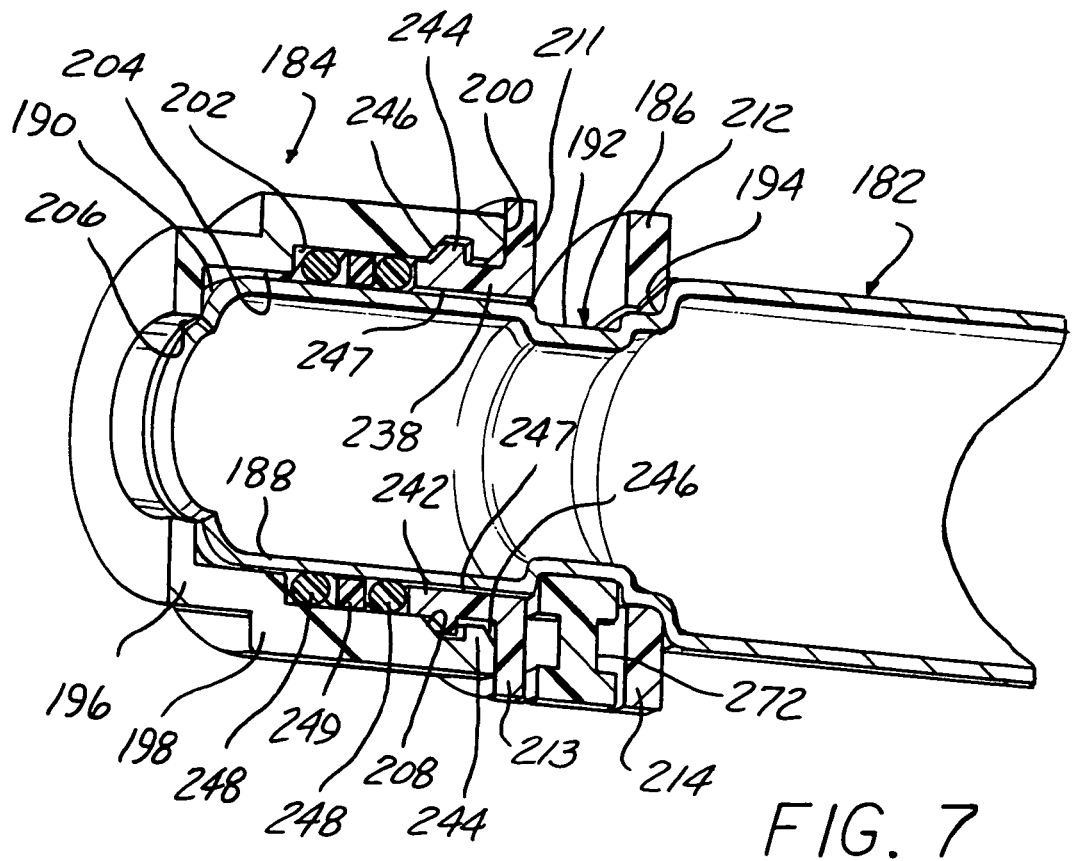
FIG. 7 is longitudinal, cross-sectional view take along the longitudinal axis of the quick connector shown in FIG. 5.
Figure 6:
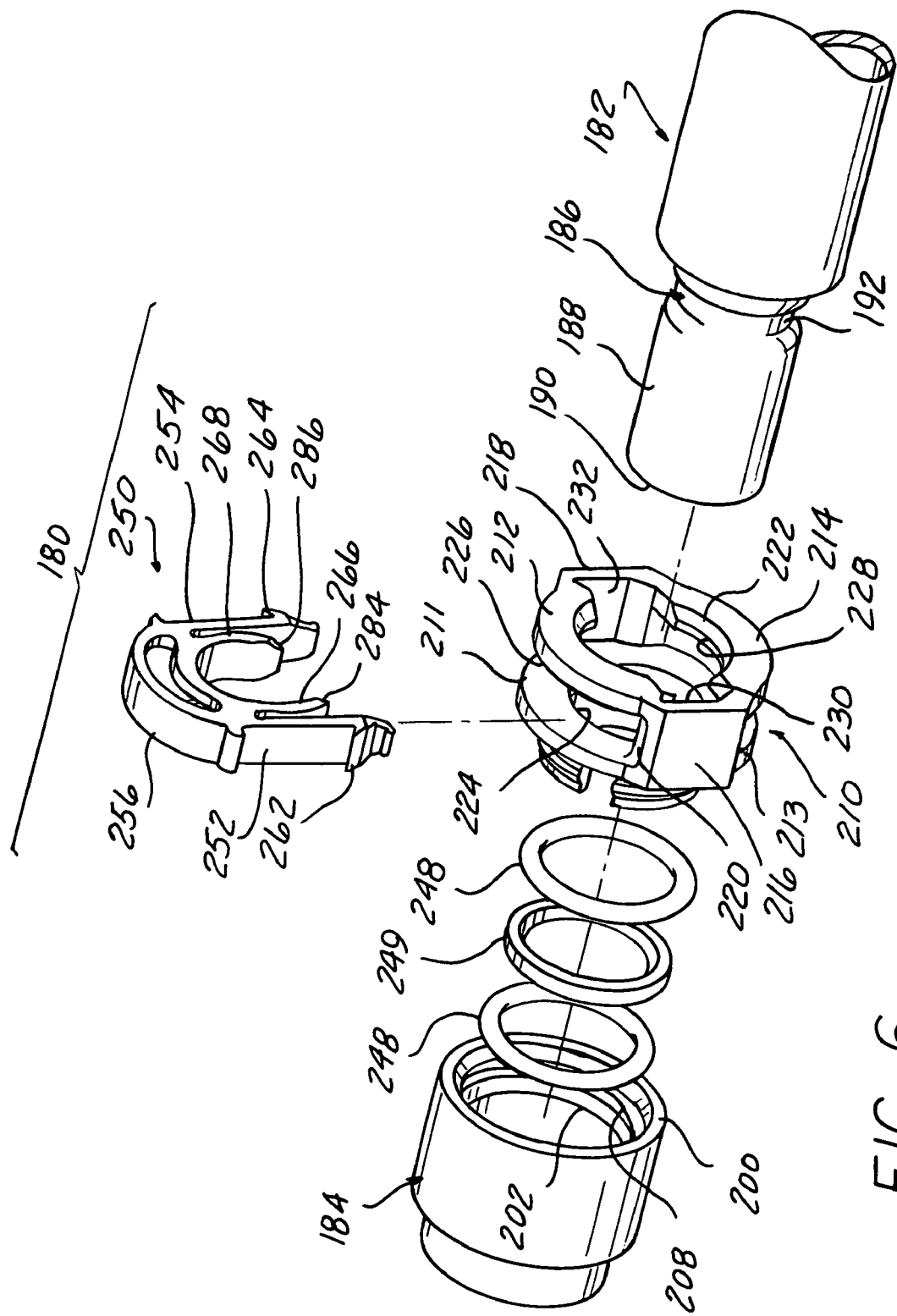
FIG. 6 is a exploded, perspective view of the quick connector shown in FIG. 5.

As shown in FIGS. 6 and 7, the first endform 182 generally comprises a tubular member having a surface engagement feature 186 located at a position on a tip end portion 188 extending from a tip end 190. The surface engagement feature 186, by example only, is an annular recess or groove 192 formed in the endform 182. The annular recess or groove 192 has a smaller inner diameter than the inner diameter of the tip end portion 188 or the remainder of the endform 182. A step 194 of a large inner diameter than the inner diameter of the recess 192, but smaller than the inner diameter of the remainder of the endform 182 is also formed as part of the surface engagement feature 186 and extends as a transition surface between the groove 192 and the remainder of the endform 182. It will be understood that the surface engagement feature 186 can function, as described hereafter, without the step 194.

The second endform 184 is shown by example only as having a necked down or small diameter portion 196 extending from a larger inner diameter and larger outer diameter end portion 198 which extends linearly from a first end 200. A bore 202 extends from the first end 200 of the second endform 184. The bore 202 steps down to a smaller diameter bore portion 204 and then to a third yet smaller diameter bore portion 206. It will be understood that the bore extending through the second endform 184 may have other configurations including more or less stepped down or stepped up diameter portions.

An annular recess or groove 208 is formed in the bore portion 202 spaced inward from the first open end 200 of the second endform 184. The purpose of the recess 208 will be become apparent from the following description.

Figure 5:
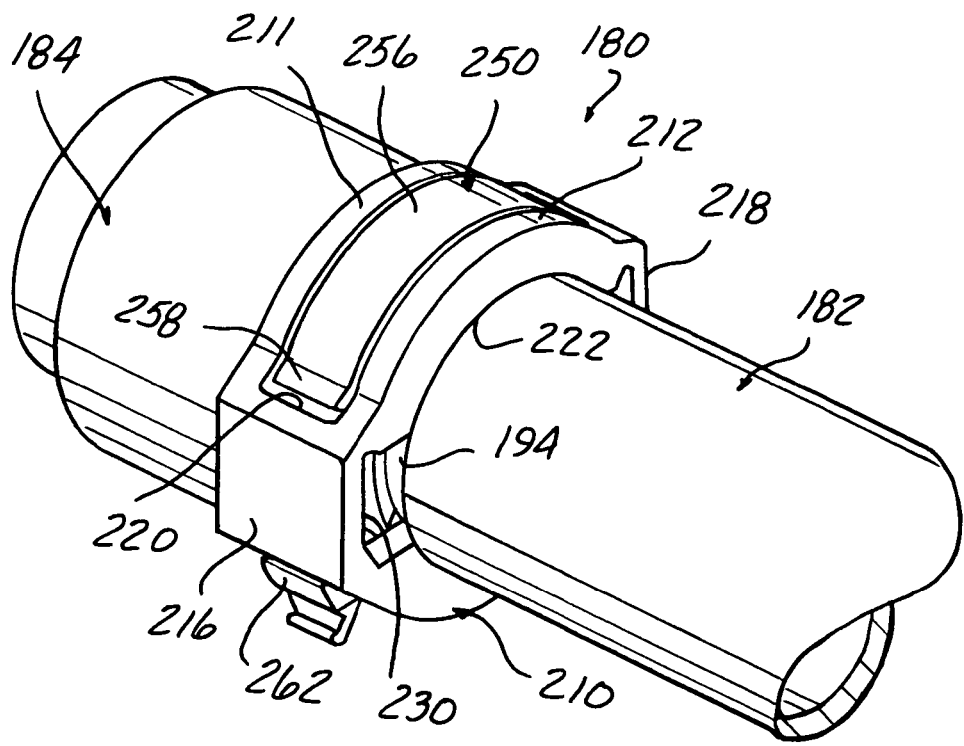
FIG. 5 is a perspective view of another aspect of a fluid quick connector.
Figure 8:
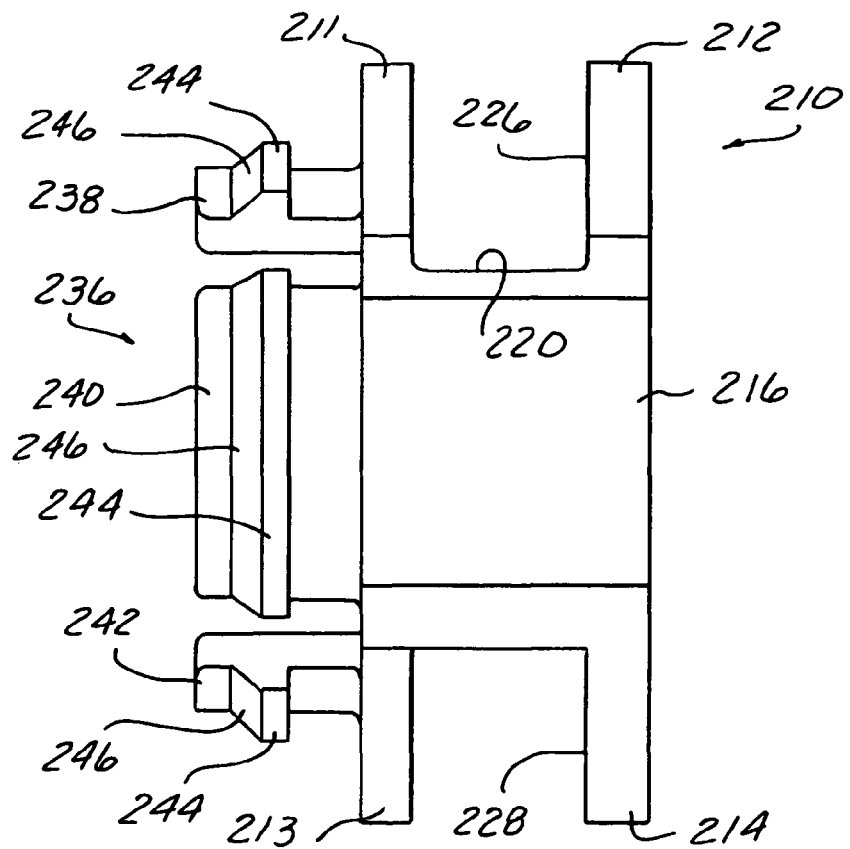
FIG. 8 is an enlarged, side elevational view of the housing of the quick connector shown in FIG. 5.

As shown in FIGS. 6, 7 and 8, the quick connector 180 includes a housing 210 formed, by example, as a one-piece, unitary body of, typically a plastic, but also of other materials. The housing 210 includes a first pair of spaced, arcuate ring members 211 and 212 and a second pair of arcuate ring member 213 and 214. A pair of spaced, generally parallel second pair ring members 213 and 214. The ring members 211, 212, 213, and 214 are joined to each other by a pair of side flanges 216 and 218 which extend between the ends of the ring members 211, 212, 213, and 214. A recess 220, only one of which is shown in FIGS. 5 and 6, is formed on one edge of the side flanges 216 and 218 for receiving a portion of a retainer as described hereafter. The ring members 212 and 214 and the interconnecting portions of the side flanges 216 and 218 form a first aperture 222 at a first end of the housing 210. Similarly, the ring members 211 and 212 and the opposite end portions of the side flanges 216 and 218 form a second bore 224. The first and second bores 222 and 224 are co-axial.

The spaced apart ring members 211 and 212 form a first bore 226 which is aligned with a second transverse bore 228 formed between the opposite ring members 213 and 214. The transverse bores 226 and 228 form a through transverse bore extending through the housing 210 which intersects a longitudinal through bore formed by the bores 222 and 224.

Notches 230 and 232 are formed on an inner surface of the side flanges 216 and 218 for receiving a retainer in a pre-assembled, shipping position as described hereafter.

In this aspect of the quick connector 180, the housing 210 is rotatably latched to the second endform 184. It will be understood that the features of the quick connector 180 may also be employed in quick connector housings which are fixedly and non-rotatably latched to another fluid component or endform.

The housing 210 includes a collar 236 which is formed of at least one or, more typically, a plurality of arcuate shaped legs, with four legs being described by way of example only, even though only three legs 238, 240 and 242 are shown in FIG. 8.

Each leg 238, 240 and 242 extends from one edge of the ring members 211 and 213 and/or the edge of the side flanges 216 and 218 in a generally axial direction with respect to the longitudinal axis through the aligned bores 222 and 224 in the housing 210. Each leg 238, 240, and 242 defines a portion of a circle and has a cantilevered, bendable configuration with respect to the remainder of the housing 210 enabling each leg 238, 240 and 242 to bend inward during coupling of the housing 210 to the second endform 184, as described hereafter, and then to snap radially outward such that a portion of each leg 238, 240 and 242 snaps into and rotatably, but axially non-movably, locks the housing 210 to the second endform 182.

Each leg 238, 240 and 242 includes a locking surface 244 in the form or a projection or hook extending radially from the axial extent of each leg 238, 240, and 242. The axially forwardmost portion of each locking surface 244 has a ramp 246 to facilitate the radial inward bending movement of each leg 238, 240 and 242 as describe hereafter.

The locking surfaces 244 snap into the annular recess 208 in the second endform 184, as shown in FIG. 7, to rotatably, but non-axially movably, couple the housing 210 to the second endform 184.

As shown in FIG. 7, the inner diameter 247 of each of the legs 238, 240 and 242 is the same or just slightly larger than the outer diameter of the tip end portion 188 of the first endform 182. This coaxially disposes the arms 238, 240, and 242 in line with the seal means in the housing 210. In this manner, the housing 210 eliminates the need for a separate top hat typically employed in prior quick connectors to retain the seal means, such as a pair of O-rings 248 and an intervening, rigid annular spacer ring 249, in the bore in the second endform 184. The inner diameter 247 of the legs 138, 240 and 242 also serves as a bearing surface for the tip end 188 of the endform 182.

As shown in detail in FIGS. 5-11, a retainer 250 forms part of the quick connector 180 and functions to releasibly latch the first endform 182 in the housing 210. The retainer 250 is typically constructed as a one piece, unitary body formed of a molded plastic. The retainer 250 includes first and second side legs 252 and 254 which extend from an end wall 256. A pair of side tabs 258 and 260 extend laterally outward at the connection point of the side legs 252 and 254 to the end wall 256.

An opposite end of each side leg 252 and 254 carries a latch element 262 and 264 in the form of an outwardly extending hook-shaped latch projecting laterally outward from the outer surface of each side leg 252 and 254, respectively. The latch elements 262 and 264 serve a first function of latching the retainer 250 in a preassembly, shipping position shown in FIG. 10 by bending inward during insertion of the retainer 250 through the first transverse bore 226 and then snapping laterally outward into the notches 230 and 232 in the side flanges 216 and 218, respectively, of the housing 210.

Figure 10:
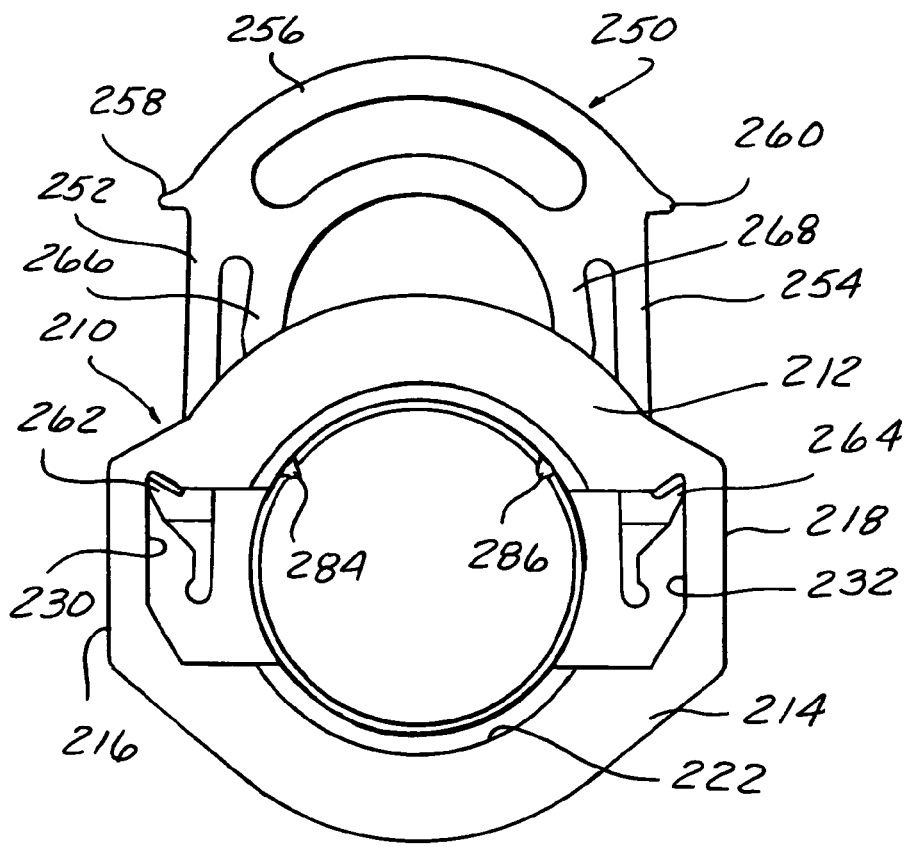
FIG. 10 is an end view of the quick connector shown in FIG. 5, prior to insertion of the endform into the housing and with the retainer shown in a pre-assembly, shipping position.

While the retainer 250 can slide downward within the notches 230 and 232 from the initial latched position shown in FIG. 10, the latch elements 262 and 264 still remain captured within the notches 230 and 232 thereby preventing removal of the retainer 250 from the housing 210.

A pair of inner arms 266 and 268 are disposed laterally inward of the side legs 252 and 254, respectively. The arms 266 and 268 are interconnected by an end wall 270 which is spaced by a recess 272 from the end wall 256. An opposed recess is also formed on an opposite edge of the end wall 270 and the end wall 256. The end wall 270 is interconnected to the side legs 252 and 254 and/or the end wall 256 by webs 274 and 276. An inner surface 278 formed by the arms 266 and 268 and the end wall 270 forms a portion of a circle. The diameter of the inner surface 278 between opposed portions of the arms 266 and 268 is the same or slightly larger than the outer diameter of the recess 192 in the first endform 182.

The inner diameter of the inner surface 278 or the spacing between the arms 266 and 268 is smaller than the outer diameter of the tip end portion 188 of the first endform 182. In this manner, if the retainer 250 is inadvertently moved from the preassembled, shipping position shown in FIG. 10 to the fully latched position shown in FIG. 11 and described hereafter, prior to insertion of the first endform 182 into the housing 210, the inner arms 266 and 268 will block insertion of the tip end 188 of the first endform 182 past the retainer 250 into the housing 210. Only when the retainer 250 is in the preassembled shipping position shown in FIG. 10, with the ends 280 and 282 of the arms 266 and 268 not substantially entering the longitudinal through bore in the housing 210, can the tip end 188 of the endform 182 be fully inserted through the housing 210 and into the bore portions 202 and 204 in the second endform 184, shown in FIG. 7 wherein the tip end 188 is sealed by the seal elements 248 and 249 to the second endform 184. At this time, the retainer 250 can be urged laterally through the housing 210 which initially causes the ends 280 and 282 of the arms 266 and 268 to initially flex outward about the outer diameter of the recess 192 and then close around the recess 192 to lock the retainer 250 in the surface engagement feature 186 or recess 192 of the first endform 182 and latch the first endform 182 in the housing 210.

Figure 11:
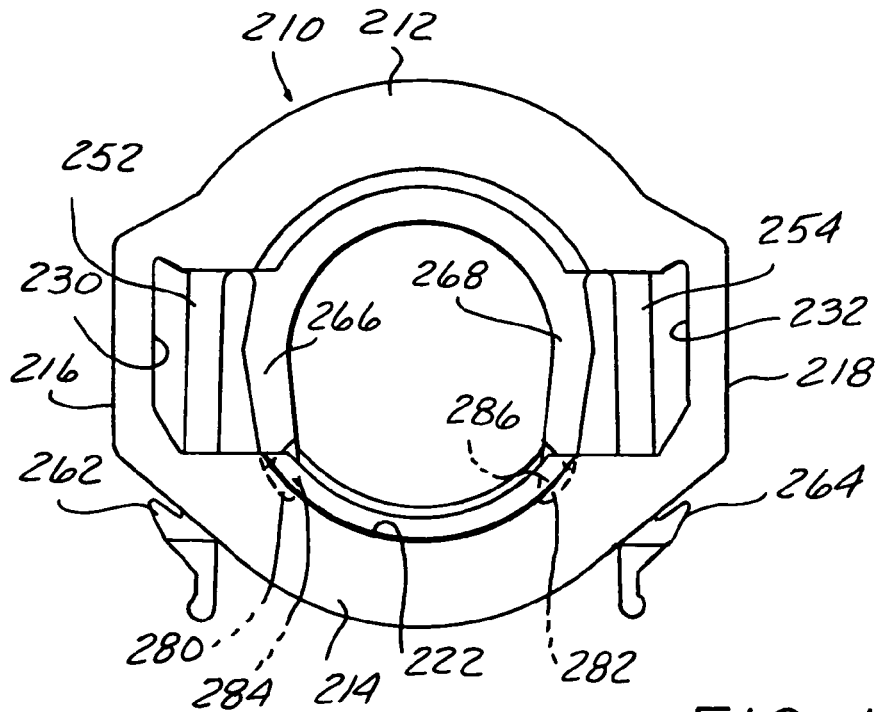
FIG. 11 is an end view, similar to FIG. 10, but showing the retainer in the fully latched position after endform insertion into the housing.

At this time, as shown in FIG. 11, the latch elements 262 and 264 have moved laterally inward and then snapped back laterally outward along a lower surface of the side flanges 216 and 218 to latch the retainer 250 in the housing 210 in the fully latched position.

The ends 280 and 282 of the arms 266 and 268, respectively, are provided with a length so as to extend into the bore 228 formed between the annular ring members 213 and 214, as shown in FIG. 11 when the retainer 250 is in the fully latched position. This causes the arms 266 and 268 to uniquely increase the pullout force resistance provided by the retainer 250 to resist separation of the first endform 182 from the second endform 186 in the housing 210 due to the engagement of the ends of the arms 266 and 268 with the ring member 214 of the housing 210.

Figure 9:
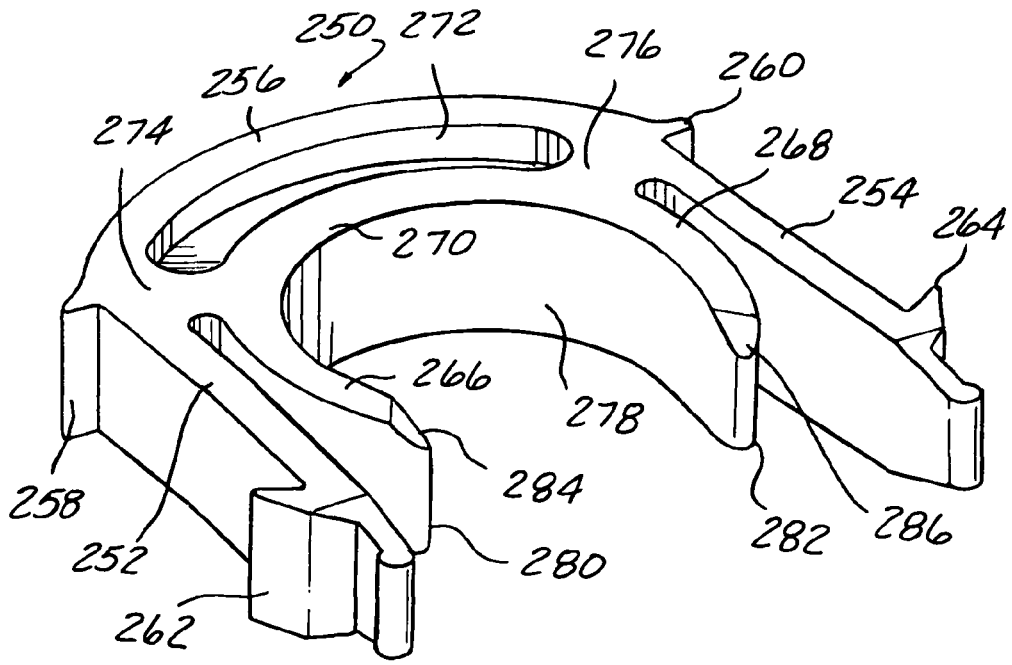
FIG. 9 is an enlarged perspective view of the retainer of the quick connector shown in FIG. 5.

Further, as shown in FIGS. 6, 9 and 11, endform contact surfaces 284 and 286 are formed on the ends 280 and 282 of the arms 266 and 268, respectively. Rather than an angled or flat, tapered surface, the surfaces 284 and 286 are formed as part of a spherical surface. The outer surface of the arms 266 and 268 are formed with an elliptical shape thereby making the length of the arms 266 and 268 longer so as to be disposed within the bore 228 formed between the ring members 213 and 214 when the retainer 250 is in the fully latched position shown in FIG. 11.

The contact surfaces 284 and 286 will project into the longitudinal bore extending to the housing 210 depending upon the position of the retainer 250 in the preassembly, shipping position shown in FIG. 10.

In use, the retainer 250 will initially be latched to the housing 210 in the shipping position shown in FIG. 10. As shown in FIG. 7, the tip end 188 of the first endform 182 is inserted through the bore 222 extending from one end of the housing 210 until the tip end 188 of the first endform 182 engages the contact surfaces 284 and 286 of the retainer 250 the insertion force applied to the first endform 182 forces the retainer 250 upwards in the orientation shown in FIG. 10 until the contact surfaces 284 and 286 clear the outer diameter of the tip end 188 of the first endform 182 thereby allowing the tip end 188 of the first endform 182 to clear the contact surfaces 284 and 286 and the entire inner legs 266 and 268 of the retainer 250 and pass into the bore in the second endform 184 until the tip end 188 sealingly engages the seal member 248 and 249 and the end of the tip end 188 seats within the bore portion 204 of the first endform 188. At this time, the surface engagement feature 186 or groove 192 will be aligned with the ends 280 and 282 of the inner arms 266 and 268, respectively, of the retainer 250. The retainer 250 can then be urged from the preassembly, shipping position shown in FIG. 10 to the fully latched position shown in FIG. 11. During such transverse movement, the arms 266 and 268 expand radially outward around the outer diameter of the recess 192 in the first endform 188 and then move back to the nominal position shown in FIG. 11 in which the arms 266 and 268 of the retainer 210 are fully seated in the recess 192 to latch the first endform 182 to the second endform 184.

The housing 210 carrying the latched first endform 182 is now latchingly coupled to the second endform 184. However, in the aspect described above, the housing 210 the first endform 182 of the second endform 184 and the housing 210 of the fluid quick connector may be rotated relative to each other to place the retainer 250 in a convenient location for manipulation.

During assembly of the fluid coupling employing the quick connector 180, the seal members 248 and 249 are first inserted into the bore portion 204 of the second endform 184 through the open end 200 of the second endform 184 as shown in FIG. 7. The housing 210 carrying the retainer 250 in the preassembled, shipping position shown in FIG. 10 is then urged through the open end of the second endform 184. During such insertion, the legs 238, 240 and 242 of the housing 210 bend radially inward through engagement of the ramp surface 246 on each leg 238, 240 and 242 with a complementary ramp surface formed at the first end 200 of the second endform 184 to enable the first endform 182 is inserted a sufficient distance into the second endform until the projections 244 snap radially outward into the recess 208 in the first endform 184 as the legs 238, 240 and 242 move radially outward to their nominal position as shown in FIGS. 7 and 8.

The outermost ends of the latch arms 380 are disposed coaxially with the seal elements 330 and 332 since the inner diameter 383 of the latch arms 380 and the adjoining portion of the housing 351 is sized to be only slightly larger than the outer diameter of the tip end of the endform to be inserted through the housing 351 and into the bore 352 in the use element 354. The inner diameter 383 of th latch arms 380 and the adjoining portion of the housing 351 forms a bearing surface for the endform. In addition, the close proximity of the inner diameter of the latch arms 380 and the adjoining portion of the housing 351 and the outer surface of the endform, after the endform is fully inserted into the joined housing 351 and use element 354, prevents substantially radially inward movement of the projections or hooks 382 on the latch arms 380 so as to minimize inadvertent disengagement of the housing 351 from the use element 354.

Figure 12:
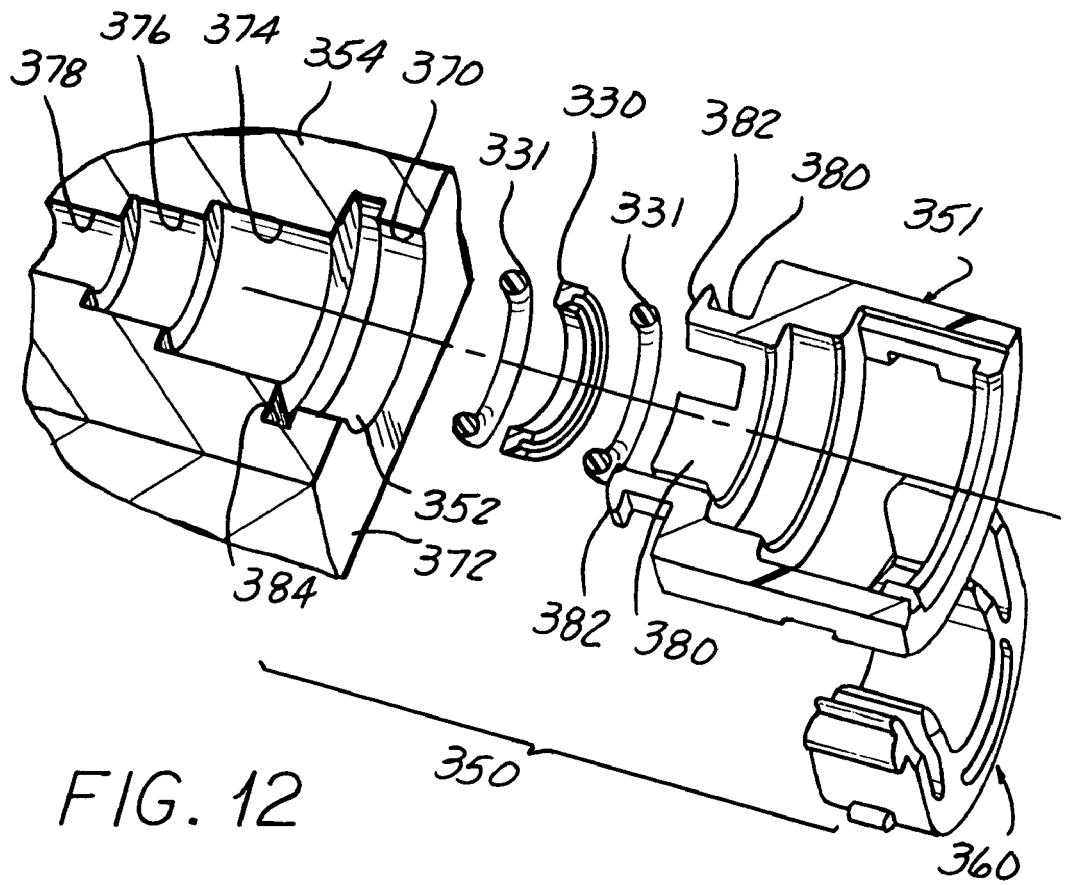
FIG. 12 is an exploded, perspective view of another aspect of the quick connector shown in a preassembled state.
Figure 13:
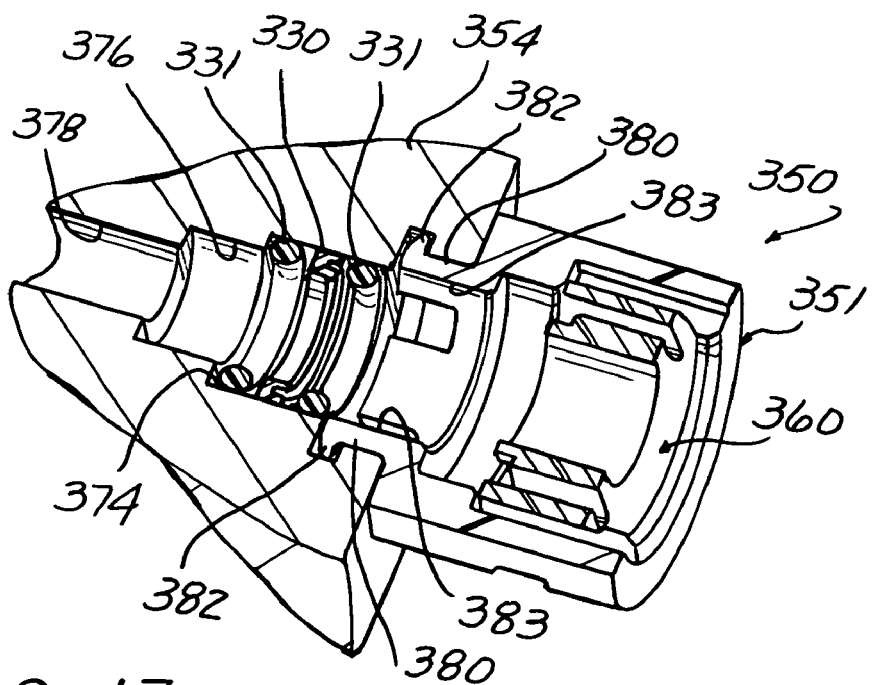
FIG. 13 is a perspective, longitudinal, cross-sectional view of the quick connector shown in FIG. 12, but depicted in an assembled state.

Referring now to FIGS. 12 and 13, there is depicted another aspect of a quick connector 350 according to the present invention in which the quick connector 350 is configured for pre-mounting in the form of a stuffer pack in a bore 352 in a use element 354, prior to receiving an endform, such as endform 13 on a tubular conduit 11, in a sealed latched position to dispose the conduit 11 in fluid flow communication with the bore 352 in the use element 354.

The quick connector 350 is constructed in essentially the same manner as the quick connector 100 described above in that it has an end configuration adapted for transversely receiving the retainer 360 which is substantially identical to the retainer 60 in FIGS. 1-4. Further details concerning the end configuration of the quick connector 350 will not be described herein as such features are the same as the corresponding structure in the quick connector 100 shown in FIGS. 1-4.

The remaining portion 360 of the top hat 358 has a diameter to slidably extend through the third stepped bore portion 24 in the housing 351 of the quick connector 350.

In this aspect, the bore 352 in a use element 354 is provided with a stepped configuration having a first bore portion 370 extending from the outer end 372 of the use element 354, an adjacent smaller, second diameter bore portion 374, a third bore portion 376 and an optional fourth bore portion 378 of even smaller diameter both extending coaxially from the second bore portion 374.

The second bore portion 374 is configured for premountingly receiving the seal means, such as one or more O-rings 331 and an intervening spacer 331.

The housing 351 of the quick connector 350 is provided with at least one and preferably a plurality of circumferentially spaced legs or arms 380, with three of the four equally spaced arms 380 being depicted in FIG. 12. Each arm 380 is spaced by a slot from an adjacent arm 380. Further, each arm 380 terminates in a radially outwardly extending hook or projection 382. The projection 382 is releasably engagable with a latch receiver 384 formed as a plurality of coplanar recesses or as a continuous annular groove 384 in the bore 352 in the use element 354 between the first bore portion 370 and the second bore portion 374.

As shown in FIG. 13, after the seals 30 and the spacer 31 have been premounted in the second bore portion 374, the quick connector housing 351 is inserted through the first bore portion 370 of the use element 354. The arms 380 have sufficient flexibility so as to bend radially inward to allow the projections 382 to clear the end of smaller diameter first bore portion 370. When the housing 351 has been inserted a sufficient distance into the bore 352 in the use element 354, the projections 382 will snap radially outward into the latch receivers 384 latching the quick connector housing 351 to the use element 354.

The retainer 360 can be then mounted in the quick connector housing 351 by transverse movement to the storage position shown in FIG. 10 or premounted in the quick connector housing 351 before the quick connector housing 351 is inserted into the bore 352 in the use element 354, as described above.

After the quick connector housing 351 is mounted in the bore 352 and the retainer 60 is situated in the temporary storage position shown in FIG. 10, The endform of a conduit can then be inserted through the open end of the quick connector housing 351 into full engagement with the seals 330 and 331. Only when the endform has been fully inserted into engagement with the seals 330 and 331 can the retainer 60 be moved from the temporary storage position shown in FIG. 10 to the fully latched position shown in FIG. 11.

Reverse movement of the retainer 360 back to the storage position shown in FIG. 4 or completely from the quick connector housing 351 will enable the endform to be separated from the quick connector 350 and the use element 354.

What is claimed is:

1. A fluid coupling comprising:
   a first endform having a tip end having an outer diameter and a recessed surface engagement feature spaced from the tip end and having an outer diameter, wherein the outer diameter of the recessed surface engagement feature is smaller the outer diameter of the tip end;
   a second endform having a bore extending from an open end, wherein the first endform and the second endform have a longitudinal axis; and
   a quick connect mechanism for fluidically coupling the first endform to the second endform, the quick connect mechanism including:
     a latch receiver formed in the bore of the second endform;
     a quick connect housing having a through bore for receiving the tip end of the first endform;
     a latch carried on the quick connect housing for engaging the latch receiver in the bore of the second endform to couple the quick connect housing to the second endform; and
     a retainer moveably mounted in the housing for securing the first endform in the quick connect housing after the first endform has been inserted through the bore of the quick connect housing and into the bore of the second endform, the retainer including outer legs releasably engagable with the quick connect housing to mount the retainer to the quick connect housing and a pair of arms having free ends radially inwardly spaced apart from the outer legs, wherein the pair of arms are engagable with the first endform, and the retainer is moveable in a direction substantially perpendicular to the longitudinal axis to lock the retainer in position
   wherein an inner diameter of the pair of arms approximate the outer diameter of the recessed surface engagement feature of the first endform is smaller than the outer diameter of the tip end of the first endform.

2. The fluid coupling of claim 1 wherein the latch receiver comprises at least one annular groove formed in the bore of the second endform.

3. The fluid coupling of claim 1 wherein the latch comprises a latch member carried on the quick connector housing adapted for releasable engagement with the latch receiver in the second endform.

4. The fluid coupling of claim 1 wherein the recess surface engagement feature of the first endform is a recessed groove.

5. The fluid coupling of claim 1 wherein the latch on the quick connect housing has an inner diameter disposed adjacent to the tip end of the first endform when the tip end of the first endform is inserted through the bore of the quick connect housing to prevent substantial radial inward movement of the latch in a direction which would disengage the latch from the second endform.

6. The fluid coupling of claim 1 further comprising a seal mounted in the bore of the second endform, wherein the latch is axially positioned with respect to the seal when the quick connect housing is coupled to the second endform to retain the seal in the bore of the second endform.

7. The fluid coupling of claim 1 including an open space between each of the outer legs and each of the pair of arms.

8. The fluid coupling of claim 1 wherein the pair of arms are radially inwardly spaced apart from the outer legs relative to a central axis of the first through bore of the quick connect housing.

9. The fluid coupling of claim 1 wherein the outer legs and the pair of arms of the retainer extend in a common direction.

10. The fluid coupling of claim 1 wherein the quick connect housing has a first width and the retainer has a second width, and, relative to the longitudinal axis, the second width is inclusive in the first width.

11. The fluid coupling of claim 1 wherein an outer surface of the retainer is flush with an outer surface of the quick connect housing.

12. The fluid coupling of claim 1 wherein the tip end is located at an end of the first endform and inside the second endform.

13. The fluid coupling of claim 1 wherein the outer legs of the retainer include a latch element that engage a surface of the quick connect housing.

14. The fluid coupling of claim 1 wherein each of the outer legs of the retainer engage one of a pair of opposing flat side flanges of the quick connect housing.

15. A fluid coupling comprising:
   a first endform having a tip end;
   a second endform having a bore extending from an open end;
   a quick connect mechanism for fluidically coupling the first endform to the second endform, the quick connect mechanism including:
     a latch receiver formed in the bore of the second endform;
     a quick connect housing having a through bore for receiving the tip end of the first endform;
     a latch carried on the quick connect housing for engaging the latch receiver in the bore of the second endform to couple the quick connect housing to the second endform, wherein the latch includes at least one leg extending from the quick connect housing, and a latch projection carried on the at least one leg is releasably engagable with the latch receiver; and
     a retainer moveably mounted in the quick connect housing for securing the first endform in the quick connect housing after the first endform has been inserted through the bore of the quick connect housing and into the bore of the second endform, the retainer including outer legs releasably engagable with the quick connect housing to mount the retainer to the quick connect housing and a pair of arms having free ends radially inwardly spaced apart from the outer legs, wherein the pair of arms are engagable with the first endform;
   a recessed surface engagement feature spaced from the tip end of the first endform having an outer diameter smaller than an outer diameter of the tip end of the first endform; and
   an inner diameter of the arms is approximate the outer diameter of the recessed surface engagement feature in the first endform and smaller than the outer diameter of the tip end of the first endform.

16. The fluid coupling of claim 15 further comprising a plurality of circumferentially spaced legs carried on the quick connector housing, each of the plurality of circumferentially space legs carrying a latch projection.

17. A fluid quick connector for receiving an endform, the quick connector comprising:

a housing having a first through bore extending from a first end to a second end and a second bore, wherein the second bore intersects the first through bore;

a retainer movably mounted in the second bore of the housing, wherein the retainer includes outer legs releasably engagable with the housing to mount the retainer in the housing and a pair of arms radially inwardly spaced apart from the outer legs; and an endform having a tip end and a surface engagement feature spaced from the tip end, wherein the surface engagement feature defines in part a recessed groove having an outer diameter smaller than an outer diameter of the tip end, the endform has a longitudinal axis, and the retainer is moveable in a direction substantially perpendicular to the longitudinal axis to lock the retainer in position, wherein the pair of arms of the retainer have an inner diameter that is smaller than the outer diameter of the tip end of the endform and approximately equal to the outer diameter of the recessed groove such that the retainer is movable through the housing to a latched position latching the endform in the housing only when the endform has been inserted through the housing to a position aligning the pair of arms on the retainer with the recessed groove in the endform.

18. The fluid quick connector of claim 17 further comprising a first ring portion and a second ring portion formed in the housing, wherein each of the first ring portion and the second ring portion having a through aperture, the though apertures of the first ring portion and the second ring portion are aligned and forming the second bore, and the pair of arms of the retainer are engagable with the second ring portion of the housing when the retainer is in the latched position to resist disengagement of the first endform from the housing.

19. The fluid quick connector of claim 17 further comprising a step formed adjacent the recessed groove in the endform, wherein the step receives a portion of the housing to limit an insertion distance of the tip end of the endform through the housing.

20. The fluid quick connector of claim 17 wherein the pair of arms have free ends spaced from each other.

21. The fluid quick connector of claim 17 wherein the outer legs and the pair of arms of the retainer extend in a common direction.

22. The fluid quick connector of claim 17 wherein the housing has a first width and the retainer has a second width, and, relative to the longitudinal axis, the second width is inclusive in the first width.

23. The fluid quick connector of claim 17 wherein an outer surface of the retainer is flush with an outer surface of the housing.

24. The fluid quick connector of claim 17 wherein the outer legs of the retainer include a latch element that engage a surface of the housing.

25. The fluid quick connector of claim 17 wherein each of the outer legs of the retainer engage one of a pair of opposing flat side flanges of the housing.

* * * * *